United States Patent [19]

Ciolek et al.

[11] Patent Number: 5,059,561

[45] Date of Patent: Oct. 22, 1991

[54] UV ATTENUATED COLORED GLASSES

[75] Inventors: Sally Ciolek, Luzerne; David Krashkevich, Dallas, both of Pa.

[73] Assignee: Schott Glass Technologies, Inc., Duryea, Pa.

[21] Appl. No.: 494,337

[22] Filed: Mar. 16, 1990

[51] Int. Cl.$^5$ .................. C03C 4/00; C03C 3/076; C03C 3/089; C03C 3/078

[52] U.S. Cl. .................. 501/13; 501/17; 501/18; 501/55; 501/65; 501/72

[58] Field of Search .................. 501/13, 44, 57, 59, 501/64, 72, 73, 18, 21, 26, 37, 38

[56] References Cited

U.S. PATENT DOCUMENTS

| | | | |
|---|---|---|---|
| 3,773,530 | 11/1973 | Morgan | 106/54 |
| 4,012,131 | 3/1977 | Krohn et al. | 351/159 |
| 4,106,946 | 8/1978 | Ritze | 106/52 |
| 4,521,524 | 6/1985 | Yamashita | 501/64 |
| 4,757,034 | 7/1988 | Prassas | 501/13 |

FOREIGN PATENT DOCUMENTS 1596981 7/1970 Fed. Rep. of Germany.

OTHER PUBLICATIONS

J. S. Stroud, "The Strengthening of Some Commercial Ophthalmic and Filter Glasses by Ion Exchange," Glass Technology, vol. 29, No. 3, Jun. 1988, pp. 108–114.

W. Vogel, *Chemistry of Glass*, 163–173.

*Primary Examiner*—William R. Dixon, Jr.
*Attorney, Agent, or Firm*—Millen, White & Zelano

[57] ABSTRACT

Glasses containing chromophores are partially struck to produce no coloring or only light coloring due to the chromophore. The glasses are colored as desired by contents of colorant ions.

19 Claims, 4 Drawing Sheets

UV ATTENUATED COLORED GLASSES

BACKGROUND OF THE INVENTION

Glasses have sharp cut-on points at wavelengths in the vicinity of the border of the UV and visible ranges are known. They are used primarily as cut-off filter glasses. One technique for achieving this effect is the introduction into the glass of chromphoric colorants (i.e., chromophores) such as cadmium sulfide, cadmium selenide and cadmium telluride. See, e.g., W. Vogel, *Chemistry of Glass*, 163-173, American Ceramic Society, 1985.) The glasses become colored by "striking" of the base melts, e.g., by heat treatment at temperatures in the range of 550°-850° C. for times on the order of 30 min. up to 24 hrs. This heat treatment causes the formation of microcrystals which achieve the UV and/or short wavelength visible radiation cutoff and, hence, the color. A nucleation step before striking ensures uniform formation of crystallites and increases chances of reproducibility when the striking is performed in a continuous manner.

The cut-on wavelength can be varied by varying the heating conditions. See German Patent 1,596,981 and U.S. Pat. Nos. 3,773,530 and 4,106,946, which also exemplify the wide range of base glasses which are suitable.

Such struck glasses have been utilized for special uses such as traffic signal lenses for the German patent, optical filters, and shooter's (e.g., hunter's) eyeglass lenses, e.g., for S-7083 of Schott Glass Technologies Inc., Duryea, Pa. 18642, where the colors and transmittances producible in such glasses are appropriate. However, there are other important uses such as sunglasses, where these "struck" glasses have been inapplicable.

SUMMARY OF THE INVENTION

Figure 1:
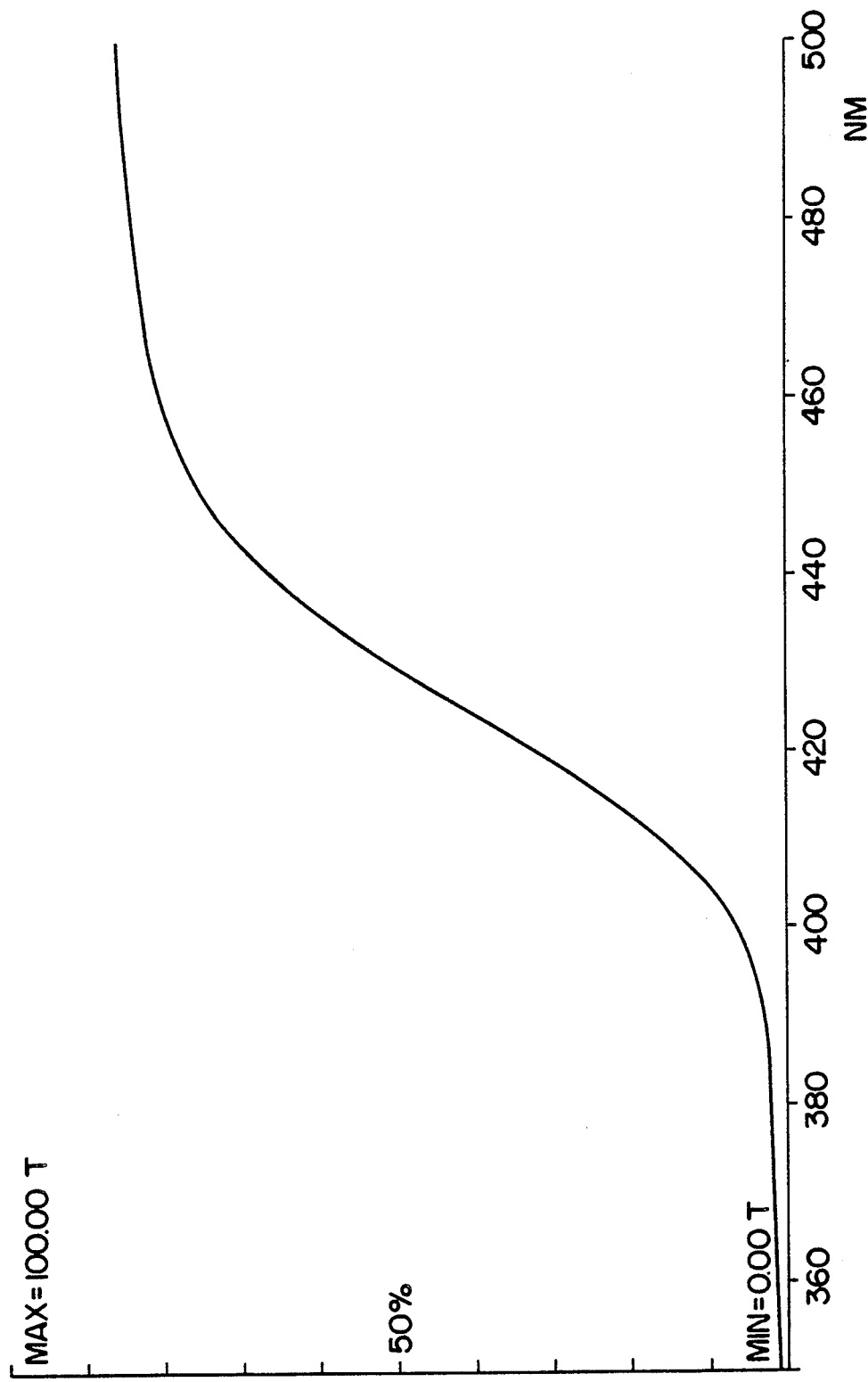
FIGS. 1-4 are graphs showing transmission spectrums for glasses of the invention.

This invention provides a new method and corresponding glass composition which produce struck glasses suitable for uses such as in sunglass lenses. The invention involves the employment of relatively less severe striking conditions (partial striking) than conventionally employed. As a result, instead of being colored as occurs with the prior art use of striking, the base glasses of this invention remain substantially noncolored by the chromaphore content and exposure to striking conditions. The color desired in the glasses of this invention is provided by additions of ions commonly added to glasses for purposes of coloring them, e.g., due to absorption effects of ions such as nickel, cobalt, vanadium, chromium, copper, neodymium, erbium, samarium, other rare earths, other transition metals, etc. (Hereinafter, these colorants are referred to as "photopic" colorants.) As a result, the glasses of this invention have the benefits of both UV attenuation due to the striking phenomenon in conjunction with the chromaphore content and also of the desirable colors provided by the classic coloring ions. Heretofore, these two "coloring" phenomena have not been used in conjunction.

This invention relates to a method of achieving a UV-region transmission cut-on spectrum of about 0% T at a wavelength of 400-450 nm and about 50% T at 420-465 nm in a struck cadmium-chalcogenide chromaphore containing glass and of achieving a desired color of said glass, comprising incorporating in said glass a photopic colorant which imparts the desired color and partially striking said glass under conditions effective to produce essentially no color or only light coloring due to said chromophor in a different glass having the same composition except lacking said photopic colorant.

It also relates to a glass having a color imparted primarily by a photopic colorant, yet containing a cadmium chalcogenide chromophoric colorant consisting essentially of, in wt %.,

| | |
|---|---|
| $SiO_2$ | 45-76 |
| $B_2O_3$ | 0-10 |
| $\Sigma R_2O$ ($R_2$ = alkali metal) | 5-30 |
| $\Sigma RO$ (R = Ca, Ba, Sr, Mg) | 0-20 |
| $TiO_2$ | 0-1 |
| ZnO | 0.5-30 |
| $\Sigma CdS$, CdSe, CdTe | 0.05-4.5 |
| ZnS | 0-4.0 | and a coloring effective amount (based on the total of the above components) of at least one of the following colorants in the following wt % ranges:

| | |
|---|---|
| NiO | 0-1.0; |
| CoO | 0-1.0; |
| $V_2O_5$ | 0-3.0; |
| $Cr_2O_3$ | 0-1.0; |
| CuO | 0-4.0; |
| $\Sigma Nd_2O_3$, $Er_2O_3$, $Sm_2O_3$ | 0-10. |

It further relates to a colored sunglass lens having attenuated UV transmission comprising colored glass containing $SiO_2$ as at least one network former;

an amount of a cadmium chalcogenide chromaphore sufficient that when said glass is struck, the UV-region transmission cut-on wavelength of said glass is shifted, said glass having been struck under temperature conditions and for a time sufficient to achieve about 0% T at 400-450 nm and about 50% T at 420-465 nm; and a coloring effective amount of a photopic colorant.

Preferably, the glass of the invention has a composition comprising, in wt %,

| | |
|---|---|
| $SiO_2$ | 45-76 |
| $B_2O_3$ | 0-10 |
| $\Sigma R_2O$ ($R_2$ = alkali metal) | 5-30 |
| $\Sigma RO$ (R = Ca, Ba, Sr, Mg) | 0-20 |
| $TiO_2$ | 0-1 |
| ZnO | 0.5-30 |
| $\Sigma CdS$, CdSe, CdTe | 0.05-4.0 and |
| ZnS | 0—3.5. |

A preferred composition is in wt %

| | |
|---|---|
| $SiO_2$ | 45-76 |
| $B_2O_3$ | 0-10 |
| $K_2O$ | 3.0-5.5 |
| $Na_2O$ | 6.0-14.0 |
| $Li_2O$ | 0-3 |
| CaO | 5-9 |
| BaO | 0-9 |
| SrO | 0-7 |
| MgO | 0-3 |
| $\Sigma$Ca, Ba, Sr, Mg (RO) | 5-20 |
| $TiO_2$ | 0-1 |
| ZnO | 0.5-30 |
| CdS | 0.05-2.0 |
| ZnS | 0.1-3.5 |

| | |
|---|---|
| -continued | |
| CdSe | 0–1.5 |
| CdTe | 0–0.5 |

Ba, Sr and/or Mg being present in addition to or as a replacement of said CaO amount, and a coloring effective amount (based on the total of the above components) of at least one of the following colorants in the following wt % ranges:

| | |
|---|---|
| NiO | 0–1.0 |
| CoO | 0–1.0 |
| $V_2O_5$ | 0–3.0 |
| $Cr_2O_3$ | 0–1.0 |
| CuO | 0–4.0 and |
| $\Sigma Nd_2O_3, Er_2O_3, Sm_2O_3$ | 0–10. |

A particularly preferred composition is in wt %

| | |
|---|---|
| $SiO_2$ | 60–73 |
| $B_2O_3$ | 4–7 |
| $K_2O$ | 3.5–5 |
| $Na_2O$ | 12–14.0 |
| CaO | 5–9 |
| ZnO | 0.5–10.0 |
| CdS | 0.1–1.5 |
| ZnS | 0.1–3.0 |
| CdSe | 0–1.0 |
| CdTe | 0–0.5 | all other components recited in the "preferred" composition above being essentially absent, and a coloring effective amount (based on the total of the above components) of at least one of the following colorants in the following wt % ranges:

| | |
|---|---|
| NiO | 0.1–0.3 |
| CoO | 0.02–0.05 |
| $V_2O_5$ | 1.5–3.0 |
| $Cr_2O_3$ | 0–0.5 |
| CuO | 0–2.0 |
| $\Sigma Nd_2O_3, Er_2O_3, Sm_2O_3$ | 5–10. |

In other preferred aspects, there are contained 2–4 wt. % of BaO and 3–9 wt. % of CaO; 0.5–10 wt. % of ZnO; and essentially no $TiO_2$.

The partial striking permits achievement of relatively low wavelength cut-ons (e.g., in the range of 400–450 nm for 0% T (transmittance) and 420–465 nm for 50% T). Such properties can be achieved in accordance with this invention, e.g., utilizing the partial striking conditions of 615°–650° C. for times of 30–150 minutes. Preferred temperatures and times typically are: 615°–625° C. for 60–120 minutes. Precise time/temperature combinations appropriate for a given glass to achieve the desired wavelength cut-on properties are routinely determinable in a given case in dependence on glass composition (and sulfur retention) and physical dimensions of the glass blank to be struck (usually a 65–71 mm diameter×3.0–3.4 mm thick pressing with a +6/−6 diopter curve for glass lenses). For example, generally useful combinations include 615°–650° C. for 30 to 150 minutes for achievement of a cut-on wavelength of 425–430 nm (50% T) and 400–410 nm (0% T) for borosilicate base glasses. One advantage of this invention's milder conditions is the avoidance of the need heretofore to employ a represser to achieve adequate striking. A represser takes a supplied gob of glass and remolds it into another configuration needed for a given application. The striking of a standard colloidally colored glass occurs during the remolding with the represser.

In view of these low cutoff wavelengths, as mentioned, the struck "base" glasses will be only lightly colored, e.g., generally having only a pale yellow hue. This can be determined by a yellowness index (YI) measurement. For example, a partially struck glass with a 50% T cut-on of 427 nm has a YI of 18.3, while a partially struck glass with a 50% T cut-on of 439 nm has a YI of 25.3 showing it is substantially more yellow than the 427 nm sample. Both are acceptable per this invention. Colorless ophthalmic glasses such as Schott's S-1 and S-3 have YI measurements between 3.0 and 5.0. As a result of the pale, colorless hue, the partially struck glasses of this invention can be doped with suitable photopic colorants in order to achieve desired colors, e.g., for sunglass lenses and other purposes, especially where UV attenuation is desirable, e.g., in tinted lenses (which have a higher transmittance than sunglass lenses). This color selectability is a very desirable attribute from a commercial standpoint.

Suitable photopic colorants include those mentioned above, especially NiO, CoO, $V_2O_5$, $Cr_2O_3$, $Nd_2O_3$, $Er_2O_3$, $Sm_2O_3$ and CuO. $Fe_2O_3$ is generally undesirable since it will compete with the Cd and Zn for sulfur. (See below.) This forms FeS (a differently colored chromophore). Therefore, the preferred photopic colorants are compounds that do not interfere with the formation of the chromophoric active component, especially CdS and/or ZnS. The amount of the colorant(s) is non-critical, and will be determined by the desired hue and intensity of color and the overall transmission in the visible range which is desired in the glass. Typically, the amount of colorant will be in the following ranges:

| | General Wt. % Input | Preferred Wt. % Input |
|---|---|---|
| NiO (sl purple-yellow)* | 0–1.0 | 0–0.3 |
| CoO (blue) | 0–1.0 | 0–0.05 |
| $V_2O_5$ (intense green) | 0–3.0 | 0–1.5 |
| $Cr_2O_3$ (lime green) | 0–1.0 | 0–0.5 |
| CuO (blue-blue green) | 0–4.0 | 0–2.0 |
| $Nd_2O_3$ (purple), $Er_2O_3$ (pink), $Sm_2O_3$ (yellow) | 0–10.0 | 0–5.0 |

*colors are nominal only

These are based on total glass weight, not including the photopic colorant. Mixtures can be used, the total amount being chosen to provide the color hue and intensity and total transmittance desired. Typically, the minimum input amount (wt %) of each colorant when included will be approximately 0.01% for NiO, 0.0005% for CoO, 0.10% for $V_2O_5$, 0.10% for $Cr_2O_3$, 0.06% for CuO and 0.50% for the rare earths, lower and higher amounts also being suitable. The integrated percent of visible light transmitted (photopic transmission) typically is 12–40%, preferably 12–30%, at 2 mm thickness for sunglass lenses, for example. Amounts of other colorants can be chosen routinely using conventional considerations.

Base glass compositions (i.e., compositions without a colorant) which can be partially struck to achieve the desired properties of this invention include those having $SiO_2$ as a (or the) network former, and especially include the following borosilicate glasses:

|  | General<br>Wt. % Input | Preferred<br>Wt. % Input |
| --- | --- | --- |
| SiO$_2$ | 45-76 | 60-73 |
| B$_2$O$_3$ | 0-10 | 4-7 |

A borosilicate glass matrix is not necessary to make these yellow-colorless strikeable glasses. Also useful will be conventional silicate, aluminosilicate, and phospho-alumino-silicate compositions well known in the literature. Where included, typical amounts of Al$_2$O$_3$ will be 0-3 wt % and of P$_2$O$_5$ will be 0-4 wt. %. However, a borosilicate matrix melts and processes at lower temperatures and possesses acceptable chemical durability and hence is preferred. These lower temperatures again aid in the retention of S in the melt (see below) to ensure that proper striking will occur in the final product. Additions of Al$_2$O$_3$ increase melt temperatures and the viscosity of the glass thereby creating sulfur retention problems.

Alkali metal oxides: R$_2$O (Na+K+Li) are generally contained in 5-30 wt. %:

|  | General<br>wt. % | Preferred<br>when included |
| --- | --- | --- |
| K$_2$O | 3.0-5.5 | 3.5-5.0 |
| Na$_2$O | 6.0-14.0 | 12-14 |
| Li$_2$O | 0-3.0 | 0-2.0 |

Rubidium and cesium are less preferred due to expense. If amounts of the alkali metal oxides (collectively and individually) greater than those recited above are employed, in general, devitrification stability decreases. If the amount of sodium oxide is lowered, insufficient chemstrengthenability (discussed below) is achieved. If amounts of potassium oxide greater than those mentioned are included, chemstrengthenability is also adversely affected. If the amount of lithium is increased, unacceptable turbidity occurs.

Alkaline earth oxides (RO (sum)) are generally included in amounts of 0-20 wt. %.

|  | General<br>wt. % | Preferred<br>when included |
| --- | --- | --- |
| CaO | 5-9 | 6-8 |
| BaO | 0-9 | 2-9 (4-9, most preferred) |
| SrO | 0-7 | 3-5 |
| MgO | 0-3 | 1-3 |

The alkaline earth oxides play their usual role in silica-containing glasses, e.g., they increase durability. If the amounts are too high, however, there will be adverse influences on the chemstrengthenability of the glass caused by interference effects during the chemstrengthening process. For example, depth of layer (D.O.L. ($\mu$m)) and/or M.O.R. (modulus of rupture (nm/cm)) worsens. Calcium is the preferred alkaline earth oxide. Barium, strontium and/or magnesium can be used in addition to or as a replacement for some or all of the calcium. However, each causes different phenomena in the melting and/or striking of the glass.

If too much barium is included, there is an adverse effect on striking. Absorption peaks occur in the vicinity of the cut-on wavelength. These absorbances are believed to be due to BaS or BaSO$_4$. The latter postulated species are supported by the observed better retention of sulfur in barium-containing glasses. Thus, the amounts of barium, as stated above, represent a balance between the adverse effects of the absorption peaks and the beneficial impact on sulfur retention. With enhanced sulfur retention, the amounts of other sulfur-contributing components can be reduced, thereby alleviating sulfur bubble formation during melting. In addition, it should also beneficially impact the interrelationship among molten glass, sulfur and platinum which also produces bubbles primarily during refining of the glass.

When magnesium is included, there is a slight increase in glass viscosity, causing increased refining difficulties. Strontium additions do not have deleterious impact on viscosity but also do not enhance sulfur retention properties.

Suitable chromophoric colorants include CdS, CdSe, and CdTe in amounts of 0.05-4.5 wt. %. When CdS is used, ZnS is greatly preferred in addition to help retain S in the melt. The S is covalently bonded to the Zn. In general ZnS can be used in amounts of 0-4.5 wt. %. A particularly preferred set of contents is:

|  | General | Preferred |
| --- | --- | --- |
| CdS | 0.05-1.0 | 0.1-0.6 |
| ZnS | 0-4.0 | 0.1-0.5 |
| CdSe | 0-1.0 | 0.1-0.5 |
| CdTe | 0-2.5 | 0.1-0.4 |

Amounts of CdS and ZnS less than what is listed will typically produce glass that will insufficiently strike to the desired wavelength. Amounts larger than the listed ranges produce problems during the manufacturing of the glass, e.g., large amounts of retained S give rise to bubble formation in the molten glass. These become very hard if not impossible to refine out of the glass. Also, some colorants added may form an undesirable product such as CoS which is not very soluble in the glass matrix; and, on occasion, will form a black glass. Some of the other chromophoric colorants when used in too large amounts (CdS, CdSe, CdTe) are extremely harsh on platinum. They alloy quite readily under the proper conditions and cause brittleness and failure of the Pt after extended exposure. The amount of retained S in the melt preferably falls between 280 and 400 ppm S. Inclusion of appropriate amounts of ZnO and ZnS ensures this retention and allows the glass to strike to the desired wavelength. For CdTe and CdSe, harsher striking conditions are generally required.

Suitable amounts of zinc oxide are 0.5-30 wt. %, preferably 0.5-10 wt. %. Zinc oxide is a component especially useful when cadmium sulfide is a chromophore since it significantly aids in retention of S in the glass melt. Of course, S is important to form the CdS crystallite during striking. CdS cannot be added alone in the finally desired amounts due to sulfur loss during melting. The addition of ZnS alleviates this problem due to the enhanced sulfur retention caused by the covalent bonding of sulfur to zinc. However, if too much zinc sulfide is added, sulfur content can increase to such an extent that excess sulfur is retained thereby causing sulfur bubbles and increased difficulties during refining. In addition, as mentioned above, there is an electrochemical reaction which occurs between sulfur and platinum which can present a significant processing problem when platinum is utilized in the melting and/or refining system. The results of such a reaction again are increased bubble content and refining difficulties. By using zinc oxide in addition to zinc sulfide, the advantages of the zinc sulfur bond can be achieved without unacceptably high sulfur inclusion defects. Consequently, zinc oxide is a particularly preferred ingredient.

$TiO_2$ can also be included in the glasses, e.g., up to 1 wt. %. Such inclusions enhance glass durability and can also be used to increase the index of refraction. However, the primary advantage of small $TiO_2$ inclusions is their usefulness as nucleating agents for the growth of cadmium sulfide crystals during heat treatment. The preferred amount of $TiO_2$ when included is 0.3-0.6 wt. %.

The glasses of this invention can be prepared using conventional considerations. Thus, they can be melted in ceramic crucibles, most preferably in continuous melting environments. The melting atmosphere should be neutral to slightly reducing to avoid oxidizing S, Se and/or Te to the volatile $SO_2$, $SeO_2$ and/or $TeO_2$. According to W. A. Weyl, *Colored Glasses*, p. 270, Society Glass Technologists (1978), in order to minimize S, Se, and/or Te volatilization, extremely hydrated batch materials are to be avoided as steam release facilitates volatilization. The conventional arsenic and antimony refining agents are generally not preferred since they inhibit glass striking. Furthermore, raw materials known to contain adverse impurities, e.g., iron, lead, etc., should be avoided in order to avoid difficulties in achieving proper transmission and cut-on features.

The glass of this invention can be provided in any desirable shape using conventional molding procedures well known in the glass industry. When ophthalmic applications are desired, at least one polished surface of a glass component of this invention is typically strengthened. Chemstrengthening is greatly preferred since conventional air hardening, normally performed above the $T_g$ of the glass, would affect the final cut-on of the glass. Chemstrengthening, of course, is typically achieved by exchanging smaller alkali metal ions (e.g., sodium) before larger ions (e.g., potassium). For these purposes, it is especially preferred that the amount of sodium be at least 7 wt. %. Conventional exchange solutions can be used, e.g., a crown-bath solution containing, e.g., 99.5% $KNO_3$ and 0.5% silicic acid at a temperature in the range of about 480°-550° C. for an exchange time of, e.g., 16 hours or more generally 8-24 hours. Typically, a preferred exchange temperature will be approximately 30° lower than the transformation temperature of the glass. Determination of optimum chemstrengthening layer thicknesses can be effected routinely. Typically, acceptable thicknesses of a chemstrengthened layer will be above 30 μm, preferably above 50 μm. However, narrower and larger thicknesses are fully included. Typical surface compression values achievable will be 2700-3000 nm/cm (birefringence).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application(s), are hereby incorporated by reference.

EXAMPLES

Figure 2:
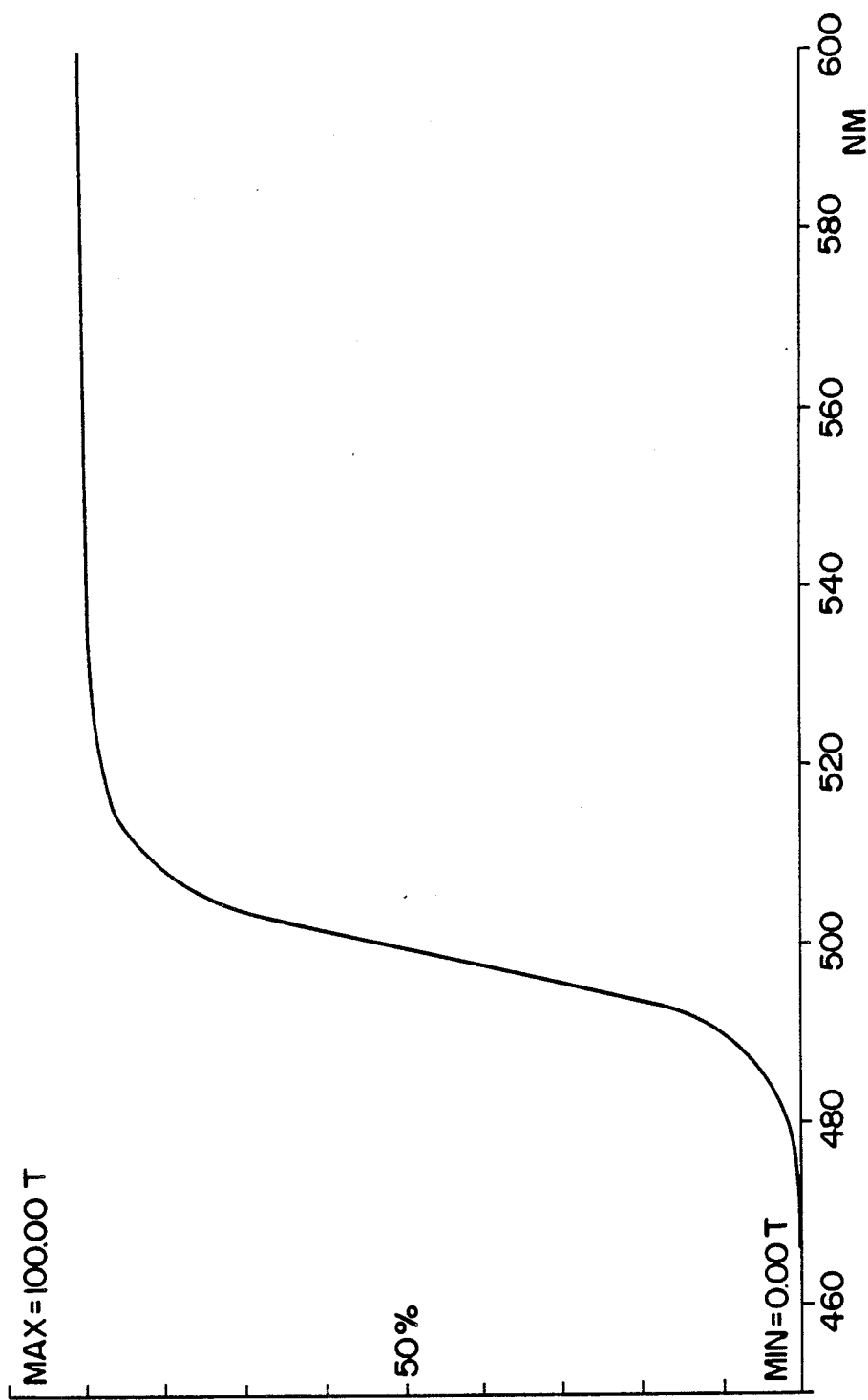
Figure 3:
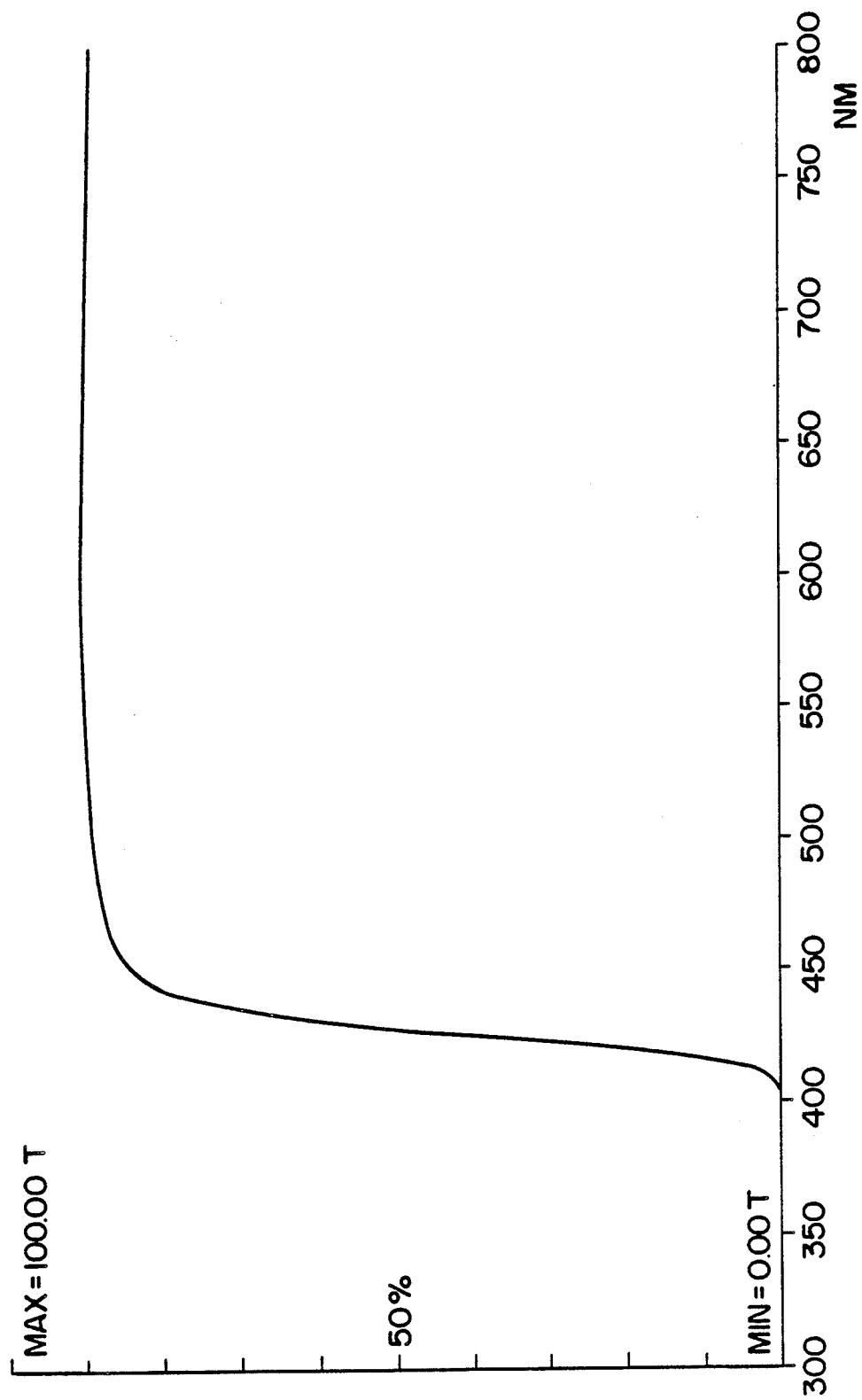
Figure 4:
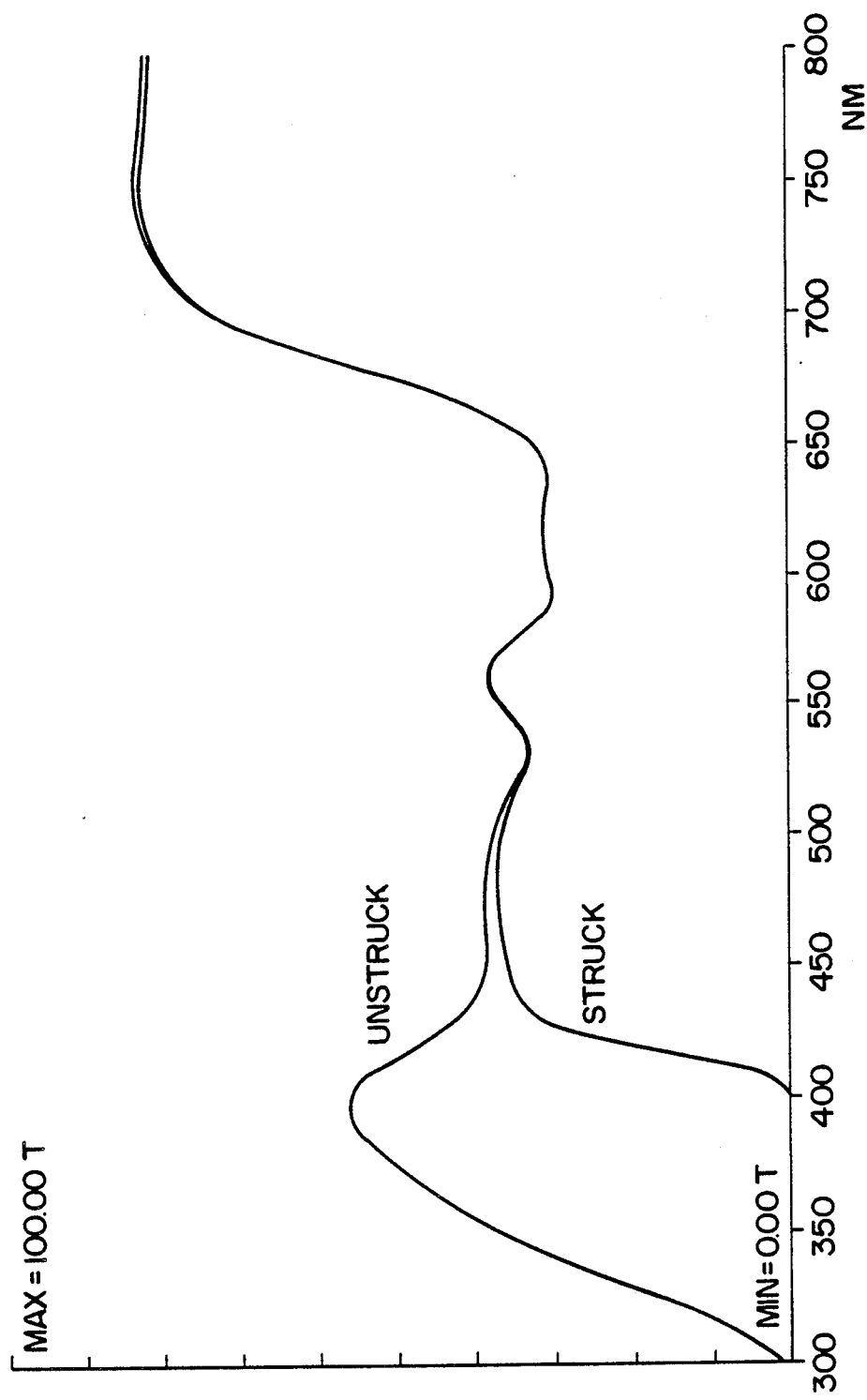

Glass compositions shown in the table were melted at approximately 1300° C. FIG. 1 shows the transmission spectrum of a typical glass, unstruck. FIG. 2 shows the same spectrum for the same glass when struck at 800° C. for 30 minutes. FIG. 3 shows the transmission spectrum for the same glass, partially struck, i.e., at 625° C. for 1 hour. FIG. 4 gives the spectrum for another glass of this invention, both unstruck and struck (625° C. for 1 hour).

|  | Weight Percent | | | | | | | |
| --- | --- | --- | --- | --- | --- | --- | --- | --- |
|  | 1 | 2 | 3 | 4 | 5 | 6 | 7 | 8 |
| $SiO_2$ | 68.80 | 68.80 | 68.80 | 68.80 | 68.80 | 68.80 | 68.80 | 68.80 |
| $B_2O_3$* | 5.50 | 5.50 | 5.50 | 5.50 | 5.50 | 5.50 | 5.50 | 5.50 |
| $Na_2O$ | 13.20 | 13.20 | 13.20 | 13.20 | 13.20 | 13.20 | 13.20 | 13.20 |
| $K_2O$ | 4.30 | 4.30 | 4.30 | 4.30 | 4.30 | 4.30 | 4.30 | 4.30 |
| $Li_2O$ | — | — | — | — | — | — | — | — |
| CaO | 4.85 | 4.85 | 4.85 | 4.85 | 4.85 | 4.85 | 4.85 | 4.85 |
| ZnO | 0.82 | 0.82 | 0.82 | 0.82 | 0.82 | 0.82 | 0.85 | 1.0 |
| CoO | 0.029 | 0.036 | — | — | — | — | — | 0.029 |
| NiO | 0.170 | 0.250 | — | — | — | — | 0.176 | — |
| CdS | 0.40 | 0.40 | 0.40 | 0.40 | 0.40 | 0.40 | 0.40 | 0.40 |
| ZnS | 0.11 | 0.11 | 0.11 | 0.12 | 0.12 | 0.12 | 0.11 | 0.11 |
| $V_2O_5$ |  |  |  | 2.50 | 2.50 | 2.50 |  |  |
| $Nd_2O_3$ |  |  |  |  | 5.00 | 10.00 |  |  |
| BaO | 2.00 | 2.00 | 2.00 | 2.00 | 2.00 | 2.00 | 2.00 | 2.00 |
| MgO |  |  |  |  |  |  |  |  |
| CdTe |  |  |  |  |  |  |  |  |
| $Na_2SeO_3$ |  |  |  |  |  |  |  |  |

|  | Weight Percent | | | | | | | | |
| --- | --- | --- | --- | --- | --- | --- | --- | --- | --- |
|  | 9 | 10 | 11 | 12 | 13 | 14 | 15 | 16 | 17 |
| $SiO_2$ | 61.79 | 65.28 | 67.17 | 70.54 | 69.86 | 69.52 | 71.63 | 70.38 | 68.80 |
| $B_2O_3$* | 4.94 | 5.22 | 5.37 | 5.64 | 5.58 | 5.56 | 5.73 | 5.63 | 5.50 |
| $Na_2O$ | 11.86 | 12.52 | 12.89 | 13.54 | 13.40 | 13.33 | 6.87 | 10.13 | 13.20 |
| $LiO_2$ | — | — | — | — | — | — | 3.31 | 1.63 | — |
| $K_2O$ | 3.86 | 4.07 | 4.19 | 4.40 | 4.36 | 4.33 | 4.47 | 4.39 | 4.30 |
| CaO | — | 3.25 | 5.01 | — | 3.48 | 5.19 | 7.13 | 7.01 | 4.85 |
| ZnO | 0.73 | 0.77 | 0.80 | 0.84 | 0.83 | 0.82 | 0.85 | 0.83 | 0.82 |

-continued

| | | | | | | | | | |
|---|---|---|---|---|---|---|---|---|---|
| CoO | | | | | | | | | |
| NiO | | | | | | | | | |
| CdS | 0.40 | 0.40 | 0.40 | 0.40 | 0.40 | 0.40 | 0.40 | 0.40 | — |
| ZnS | 0.11 | 0.11 | 0.11 | 0.11 | 0.11 | 0.11 | 0.11 | 0.11 | — |
| $V_2O_5$ | | | | | | | | | |
| $Nd_2O_3$ | | | | | | | | | |
| BaO | 16.83 | 8.88 | 4.57 | — | — | — | — | — | 2.00 |
| MgO | — | — | — | 5.05 | 2.50 | 1.24 | — | — | — |
| CdTe | — | — | — | — | — | — | — | — | 0.50 |
| $Na_2SeO_3$ | — | — | — | — | — | — | — | — | 0.30 |

*anhydrous

The preceding examples can be repeated with similar success by substituting the generically or specifically described reactants and/or operating conditions of this invention.

From the foregoing description, one skilled in the art can easily ascertain the essential characteristics of this invention, and without departing from the spirit and scope thereof, can make various changes and modifications of the invention to adapt it to various usages and conditions.

We claim:

1. A colored lens having attenuated UV transmission comprising colored glass containing:
   $SiO_2$ as at least one network former;
   a coloring-effective amount of a photopic colorant; and
   an amount of a cadmium chalcogenide chromophore sufficient that when said glass is struck, the UV-region transmission cut-on wavelength of said glass is shifted;
   said glass having been struck under temperature conditions and for a time sufficient to achieve about 0% T at 400–450 nm and about 50% T at 420–465 nm and to produce essentially no color or only light coloring due to said chromophore in a different glass having the same composition except lacking said photopic colorant;
   said lens being a sunglass lens.

2. The lens of claim 1 having at least one surface which has been chemstrengthened.

3. The sunglass combination comprising a sunglass frame and a sunglass lens of claim 2.

4. The lens of claim 1 in which said glass has a composition consisting essentially of, in weight %,

| | |
|---|---|
| $SiO_2$ | 45–76 |
| $B_2O_3$ | 0–10 |
| $\Sigma R_2O$ ($R_2$ = alkali metal) | 5–30 |
| $\Sigma RO$ (R = Ca, Ba, Sr, Mg) | 0–20 |
| $TiO_2$ | 0–1 |
| ZnO | 0.5–30 |
| $\Sigma CdS, CdSe, CdTe$ | 0.05–4.5 |
| ZnS | 0–4.0 | and an amount of a photopic colorant sufficient to provide a desired color in said lens.

5. The lens of claim 1 having the following composition, in wt. %:

| | |
|---|---|
| $SiO_2$ | 45–76 |
| $B_2O_3$ | 0–10 |
| $K_2O$ | 3.0–5.5 |
| $Na_2O$ | 6.0–14.0 |
| $Li_2O$ | 0–3 |
| CaO | 5–9 |
| BaO | 0–9 |
| SrO | 0–7 |
| MgO | 0–3 |
| $\Sigma Ca, Ba, Sr, Mg$ (RO) | 5–20 |
| $TiO_2$ | 0–1 |
| ZnO | 0.5–30 |
| CdS | 0.05–2.0 |
| ZnS | 0–3.5 |
| CdSe | 0–1.5 |
| CdTe | 0–0.5 |

Ba, Sr and/or Mg being present in addition to or as a replacement of said CaO amount;
and a coloring effective amount (based on the total of the above components) of at least one of the following colorants in the following wt % ranges:

| | |
|---|---|
| NiO | 0–1.0 |
| CoO | 0–1.0 |
| $V_2O_5$ | 0–3.0 |
| $Cr_2O_3$ | 0–1.0 |
| CuO | 0–4.0 and |
| $\Sigma Nd_2O_3, Er_2O_3, Sm_2O_3$ | 0–10. |

6. The lens of claim 5 having the following composition, in wt. %:

| | |
|---|---|
| $SiO_2$ | 60–73 |
| $B_2O_3$ | 4–7 |
| $K_2O$ | 3.5–5 |
| $Na_2O$ | 12–14.0 |
| CaO | 5–9 |
| ZnO | 0.5–10.0 |
| Cds | 0.1–1.5 |
| ZnS | 0–3.0 |
| CdSe | 0–1.0 |
| CdTe | 0–0.5 | all other components recited in claim 5 being essentially absent,
and a coloring effective amount (based on the total of the above components) of at least one of the following colorants in the following wt % ranges:

| | |
|---|---|
| NiO | 0.1–0.3 |
| CoO | 0.02–0.05 |
| $V_2O_5$ | 1.5–3.0 |
| $Cr_2O_3$ | 0–0.5 |
| CuO | 0–2.0 |
| $\Sigma Nd_2O_3, Er_2O_3, Sm_2O_3$ | 5–10. |

7. The lens of claim 5 containing 2–4 wt. % of BaO and 3–9 wt. % of CaO.

8. The lens of claim 4, wherein the amount of ZnO is 0.5–10 wt. %.

9. The lens of claim 7, wherein the amount of ZnO is 0.5–10 wt. %.

10. The lens of claim 5, wherein the amount of $TiO_2$ is essentially zero.

11. A method of achieving a UV-region transmission cut-on spectrum of about 0% T at a wavelength of 400-450 nm and about 50% T at 420-465 nm in a struck cadmium-chalcogenide chromophore-containing glass and of achieving a desired color of said glass, comprising incorporating in said glass a photopic colorant which imparts the desired color and partially striking said glass under conditions effective to produce essentially no color or only light coloring due to said chromophore in a different glass having the same composition except lacking said photopic colorant.

12. A glass having a color imparted primarily by a photopic colorant, yet containing a cadmium chalcogenide chromophoric colorant, consisting essentially of, in wt. %,

| | |
|---|---|
| $SiO_2$ | 45–76 |
| $B_2O_3$ | 0–10 |
| $\Sigma R_2O$ ($R_2$ = alkali metal) | 5–30 |
| $\Sigma RO$ (R = Ca, Ba, Sr, Mg) | 0–20 |
| $TiO_2$ | 0–1 |
| ZnO | 0.5–30 |
| $\Sigma CdS$, CdSe, CdTe | 0.05–4.5 |
| ZnS | 0–4.0 | and a coloring effective amount (based on the total of the above components) of at least one of the following colorants in the following wt % ranges:

| | |
|---|---|
| NiO | 0–1.0 |
| CoO | 0–1.0 |
| $V_2O_5$ | 0–3.0 |
| $Cr_2O_3$ | 0–1.0 |
| CuO | 0–4.0 and |
| $\Sigma Nd_2O_3$, $Er_2O_3$, $Sm_2O_3$ | 0–10. |

13. The glass of claim 12 having at least one surface which is chemstrengthened.

14. The glass of claim 12 having the following composition, in wt. %:

| | |
|---|---|
| $SiO_2$ | 45–76 |
| $B_2O_3$ | 0–10 |
| $K_2O$ | 3.0–5.5 |
| $Na_2O$ | 6.0–14.0 |
| $Li_2O$ | 0–3 |
| CaO | 5–9 |
| BaO | 0–9 |
| SrO | 0–7 |
| MgO | 0–3 |
| $\Sigma$Ca, Ba, Sr, Mg (RO) | 5–20 |
| $TiO_2$ | 0–1 |
| ZnO | 0.5–30 |
| CdS | 0.05–2.0 |
| ZnS | 0–3.5 |
| CdSe | 0–1.5 |
| CdTe | 0–0.5 |

Ba, Sr and/or Mg being present in addition to or as a replacement of said CaO amount:
and a coloring effective amount (based on the total of the above components) of at least one of the following colorants in the following wt % ranges:

| | |
|---|---|
| NiO | 0–1.0 |
| CoO | 0–1.0 |
| $V_2O_5$ | 0–3.0 |
| $Cr_2O_3$ | 0–1.0 |
| CuO | 0–4.0 and |
| $\Sigma Nd_2O_3$, $Er_2O_3$, $Sm_2O_3$ | 0–10. |

15. The glass of claim 14, having the following composition, in wt. %:

| | |
|---|---|
| $SiO_2$ | 60–73 |
| $B_2O_3$ | 4–7 |
| $K_2O$ | 3.5–5 |
| $Na_2O$ | 12–14.0 |
| CaO | 5–9 |
| ZnO | 0.5–10.0 |
| CdS | 0.1–1.5 |
| ZnS | 0.1–3.0 |
| CdSe | 0–1.0 |
| CdTe | 0–0.5 | all other components recited in claim 14 being essentially absent,
and a coloring effective amount (based on the total of the above components) of at least one of the following colorants in the following wt % ranges:

| | |
|---|---|
| NiO | 0.1–0.3 |
| CoO | 0.02–0.05 |
| $V_2O_5$ | 1.5–3.0 |
| $Cr_2O_3$ | 0–0.5 |
| CuO | 0–2.0 |
| $\Sigma Nd_2O_3$, $Er_2O_3$, $Sm_2O_3$ | 5–10. |

16. The glass of claim 14, containing 2–4 wt. % of BaO and 3–9 wt. % of CaO.

17. The glass of claim 12, wherein the amount of ZnO is 0.5–10 wt. %.

18. The glass of claim 16, wherein the amount of ZnO is 0.5–10 wt. %.

19. The glass of claim 14, wherein the amount of $TiO_2$ is essentially zero.

* * * * *